US011193572B2

(12) United States Patent
Grabill et al.

(10) Patent No.: US 11,193,572 B2
(45) Date of Patent: Dec. 7, 2021

(54) PULLEY WITH DRIVE FEATURE FOR BELT INSTALLATION

(71) Applicant: Cummins Inc., Columbus, IN (US)

(72) Inventors: Daniel Christopher Grabill, Columbus, IN (US); Kyle Lewis Kellar, Columbus, IN (US); Steven John Small, Columbus, IN (US)

(73) Assignee: Cummins Inc., Columbus, IN (US)

(*) Notice: Subject to any disclaimer, the term of this patent is extended or adjusted under 35 U.S.C. 154(b) by 185 days.

(21) Appl. No.: 16/483,292

(22) PCT Filed: Feb. 2, 2017

(86) PCT No.: PCT/US2017/016166
§ 371 (c)(1),
(2) Date: Aug. 2, 2019

(87) PCT Pub. No.: WO2018/143988
PCT Pub. Date: Aug. 9, 2018

(65) Prior Publication Data
US 2019/0376592 A1    Dec. 12, 2019

(51) Int. Cl.
| F16H 55/36 | (2006.01) |
| F02B 67/06 | (2006.01) |
| F16H 7/02 | (2006.01) |
| F16H 7/24 | (2006.01) |

(52) U.S. Cl.
CPC ............ *F16H 55/36* (2013.01); *F02B 67/06* (2013.01); *F16H 7/02* (2013.01); *F16H 7/24* (2013.01)

(58) Field of Classification Search
CPC ... B25B 29/00; B25B 13/48; Y10T 29/53657; F16H 7/24; F16H 7/02

USPC .................................................. 474/130, 166
See application file for complete search history.

(56) References Cited

U.S. PATENT DOCUMENTS

| 315,615 A | * | 4/1885 | Harnsberger | ............. | F16H 7/24 |
| | | | | | 474/130 |
| 551,486 A | * | 12/1895 | Brion | ........................ | F16H 7/24 |
| | | | | | 474/130 |
| 588,838 A | * | 8/1897 | Savage | ..................... | F16H 7/24 |
| | | | | | 474/130 |

(Continued)

FOREIGN PATENT DOCUMENTS

CA        2565766        4/2008

OTHER PUBLICATIONS

International Preliminary Report on Patentability received for PCT Patent Application No. PCT/US2017/016166, dated Aug. 15, 2019, 8 pages.

(Continued)

*Primary Examiner* — Henry Y Liu
(74) *Attorney, Agent, or Firm* — Faegre Drinker Biddle & Reath LLP

(57) ABSTRACT

The present disclosure provides a pulley, comprising a cylindrical wall having an outer surface with a plurality of circumferential grooves configured to receive a corresponding plurality of ribs on an inner surface of an elastic belt, a web connected to an inner surface of the cylindrical wall, a central hub connected to the web, the central hub comprises a central opening sized to be press-fit onto a drive shaft, and a drive feature configured to mate with a drive tool, thereby facilitating rotation of the pulley using the drive tool.

14 Claims, 6 Drawing Sheets

(56) References Cited

U.S. PATENT DOCUMENTS

| | | | | |
|---|---|---|---|---|
| 1,158,737 | A * | 11/1915 | Spangelo | F16H 7/24 474/130 |
| 2,499,173 | A * | 2/1950 | Taylor | F16H 7/24 474/130 |
| 2,798,438 | A * | 7/1957 | Greathouse | F16D 1/08 416/204 R |
| 4,171,653 | A * | 10/1979 | Holloway, Jr. | B25B 29/00 123/195 A |
| 4,254,540 | A * | 3/1981 | Bilak | B21D 53/28 29/893.36 |
| 4,325,703 | A * | 4/1982 | Phillips | F16H 7/24 269/249 |
| 4,824,422 | A * | 4/1989 | Jocic | F16H 55/44 29/892 |
| 5,163,883 | A * | 11/1992 | Bradfield | F16D 1/06 403/1 |
| 5,195,241 | A * | 3/1993 | Bradfield | F16D 1/06 29/892 |
| 5,269,662 | A * | 12/1993 | Denton | B60H 1/3222 417/319 |
| 5,575,728 | A * | 11/1996 | Cerny | F16H 55/36 474/170 |
| 5,653,654 | A * | 8/1997 | Davis | F16H 7/20 254/250 |
| 5,823,904 | A * | 10/1998 | Hodjat | F16H 55/44 474/170 |
| 5,857,267 | A * | 1/1999 | Cerny | F16H 55/36 29/892.11 |
| 5,951,422 | A * | 9/1999 | Roes | F16H 55/44 474/94 |
| 6,402,649 | B1 * | 6/2002 | Amkreutz | F16H 7/24 474/130 |
| 6,533,689 | B1 * | 3/2003 | Amkreutz | F16H 7/24 474/130 |
| 6,692,391 | B2 * | 2/2004 | Gerring | F16H 7/24 254/250 |
| 6,783,473 | B2 * | 8/2004 | De Meester | F16H 7/24 474/130 |
| 7,048,663 | B2 * | 5/2006 | Riaudel | F16H 7/24 474/130 |
| 7,056,244 | B2 * | 6/2006 | Hodjat | F16H 7/24 474/130 |
| 7,211,015 | B2 * | 5/2007 | Shaw | F16H 7/24 474/130 |
| 7,247,110 | B2 * | 7/2007 | Winninger | F16G 5/20 474/130 |
| 7,335,121 | B2 * | 2/2008 | Fletcher | F16H 7/24 474/130 |
| 8,241,159 | B2 * | 8/2012 | Iwata | F16H 7/24 474/130 |
| 8,397,363 | B2 * | 3/2013 | Fukatani | F16H 7/24 29/270 |
| 8,684,871 | B2 * | 4/2014 | Mitchell | F16H 7/24 474/130 |
| 8,753,238 | B2 * | 6/2014 | Kunisada | F16H 7/24 474/130 |
| 9,739,350 | B2 * | 8/2017 | Maruyama | F16H 7/24 |
| 10,436,292 | B2 * | 10/2019 | Aoki | F16H 7/24 |
| 2003/0211910 | A1 | 11/2003 | Gerring | F16H 7/24 474/130 |
| 2004/0248681 | A1 * | 12/2004 | Riaudel | F16H 7/24 474/130 |
| 2005/0164815 | A1 * | 7/2005 | Winninger | F16H 7/24 474/130 |
| 2005/0170923 | A1 * | 8/2005 | Hodjat | F16H 7/24 474/130 |
| 2005/0221934 | A1 * | 10/2005 | Shaw | F16H 7/24 474/130 |
| 2009/0056032 | A1 * | 3/2009 | Salanda | F16C 3/20 7/100 |
| 2010/0173737 | A1 * | 7/2010 | Coirault | F16H 7/24 474/130 |
| 2010/0248878 | A1 * | 9/2010 | Maruyama | F16H 7/24 474/148 |

OTHER PUBLICATIONS

International Search Report issued by the International Searching Authority, dated Apr. 27, 2017, for International Patent Application No. PCT/US2017/016166; 2 pages.

Written Opinion of the International Searching Authority, dated Apr. 27, 2017, for International Patent Application No. PCT/US2017/016166; 6 pages.

* cited by examiner

PULLEY WITH DRIVE FEATURE FOR BELT INSTALLATION

CROSS-REFERENCE TO RELATED APPLICATIONS

This application is a national phase filing of International Patent Application No. PCT/US2017/016166, titled "PULLY WITH DRIVE FEATURE FOR BELT INSTALLATION," filed on Feb. 2, 2017, the entire disclosure of which being expressly incorporated herein by reference.

FIELD OF THE DISCLOSURE

The present disclosure generally relates to press-fit pulleys and more specifically to press-fit pulleys having a drive feature which permits rotation of the pulley with a standard tool to facilitate installation of an elastic belt onto the pulley.

BACKGROUND OF THE DISCLOSURE

Conventional pulleys in vehicle applications are used in conjunction with belts to transfer power from one vehicle component to another. Such pulleys may be attached to a drive shaft of a vehicle component using a cap screw or a press-fit connection. In either case, for pulley applications where an elastic belt is used (i.e., no tensioner is coupled to the belt), it is difficult to install the belt onto the pulley. Some conventional elastic belt installation techniques require the use of custom tools. In others, the elastic belt must be manually forced onto the pulley, which may result in damage to the belt. In a great number of vehicle pulley applications, access to the pulley is limited (i.e., very little clearance), further complicating the elastic belt installation process.

Accordingly, there is a need for a pulley design, and in particular a press-fit pulley design, for elastic belt applications that facilitates easier installation of the elastic belt without the need for a custom tool.

SUMMARY OF THE DISCLOSURE

In one embodiment of the present disclosure a pulley, comprising: a cylindrical wall having an outer surface with a plurality of circumferential grooves configured to receive a corresponding plurality of ribs on an inner surface of an elastic belt; a web connected to an inner surface of the cylindrical wall; a central hub connected to the web, the central hub comprises a central opening sized to be press-fit onto a drive shaft; and a drive feature configured to mate with a drive tool, thereby facilitating rotation of the pulley using the drive tool. In one aspect of this embodiment, the web is a substantially continuous plate extending between the inner surface of the cylindrical wall and an outer surface of the central hub. In a variant of this aspect, the web comprises at least one opening adjacent the inner surface of the cylindrical wall, the opening being sized to receive a zip tie for use in installation of the elastic belt onto the pulley. In another aspect, the drive feature is formed on the central hub. In yet another aspect, the drive feature comprises a plurality of engagement surfaces disposed on an outer surface of the central hub. In a variant of this aspect, the drive feature is hexagonal and the plurality of engagement surfaces comprises six flats that are together configured to mate with a socket wrench socket. In still another aspect, the drive feature comprises a drive opening that is coaxial with the central opening of the central hub. In a variant of this aspect, the drive opening comprises a plurality of engagement surfaces disposed along a periphery of the drive opening. In a further variant, the drive opening is square and the plurality of engagement surfaces comprises four flats that are together configured to mate with a square drive of a socket wrench. In still another aspect of this embodiment, the drive feature is formed on the web.

In another embodiment, the present disclosure provides a method of installing an elastic belt onto a pulley that is press-fit onto a drive shaft, comprising: mating, at a first location on a circumference of the pulley, a plurality of ribs on an inner surface of the elastic belt with a corresponding plurality of grooves on an outer surface of the pulley; coupling a drive tool to a drive feature formed on the pulley; and causing the pulley to rotate using the drive tool, thereby causing the plurality of ribs of the elastic belt to mate with the plurality of grooves of the pulley along the circumference of the pulley. One aspect of this embodiment further comprises threading a zip tie through an opening in the pulley adjacent the first location and around the elastic belt to secure the elastic belt to the pulley at the first location; and removing the zip tie after causing the plurality of ribs of the elastic belt to mate with the plurality of grooves of the pulley. In another aspect, coupling a drive tool to a drive feature comprises coupling a socket wrench socket to a plurality of flats formed on an outer surface of a central hub of the pulley. In a variant of this aspect, coupling a drive tool to a drive feature comprises coupling a square drive of a socket wrench to a drive opening formed in a central hub of the pulley.

In still another embodiment, the present disclosure provides an engine, comprising: a crankshaft; a plurality of components driven by rotation of the crankshaft, each of the plurality of components comprising a pulley coupled to rotatable element; and an elastic belt coupled to the pulleys of the plurality of components; wherein at least one component of the plurality of components comprises a press-fit pulley that is press-fit onto a drive shaft of the rotatable element of the at least one component, the press-fit pulley comprising a cylindrical wall having an outer surface with a plurality of circumferential grooves configured to receive a corresponding plurality of ribs on an inner surface of the elastic belt, a central hub connected to the cylindrical wall, the central hub comprising a central opening sized to be press-fit onto the drive shaft, and a drive feature configured to mate with a drive tool, thereby facilitating rotation of the pulley using the drive tool to couple the elastic belt to the press-fit pulley. In one aspect of this embodiment, the drive feature is formed on the central hub. In another aspect, the drive feature comprises a plurality of engagement surfaces disposed on an outer surface of the central hub. In a variant of this aspect, the drive feature is hexagonal and the plurality of engagement surfaces comprises six flats that are together configured to mate with a socket wrench socket. In another aspect of this embodiment, the drive feature comprises a drive opening that is coaxial with the central opening of the central hub. In a variant of this aspect, the drive opening comprises a plurality of engagement surfaces disposed along a periphery of the drive opening that are together configured to mate with a square drive of a socket wrench.

BRIEF DESCRIPTION OF THE DRAWINGS

The above-mentioned and other features of this disclosure and the manner of obtaining them will become more apparent and the disclosure itself will be better understood by reference to the following description of embodiments of the present disclosure taken in conjunction with the accompanying drawings, wherein.

DETAILED DESCRIPTION OF EMBODIMENTS

The embodiments disclosed herein are not intended to be exhaustive or to limit the disclosure to the precise forms disclosed in the following detailed description. Rather, the embodiments were chosen and described so that others skilled in the art may utilize their teachings.

Figure 1:
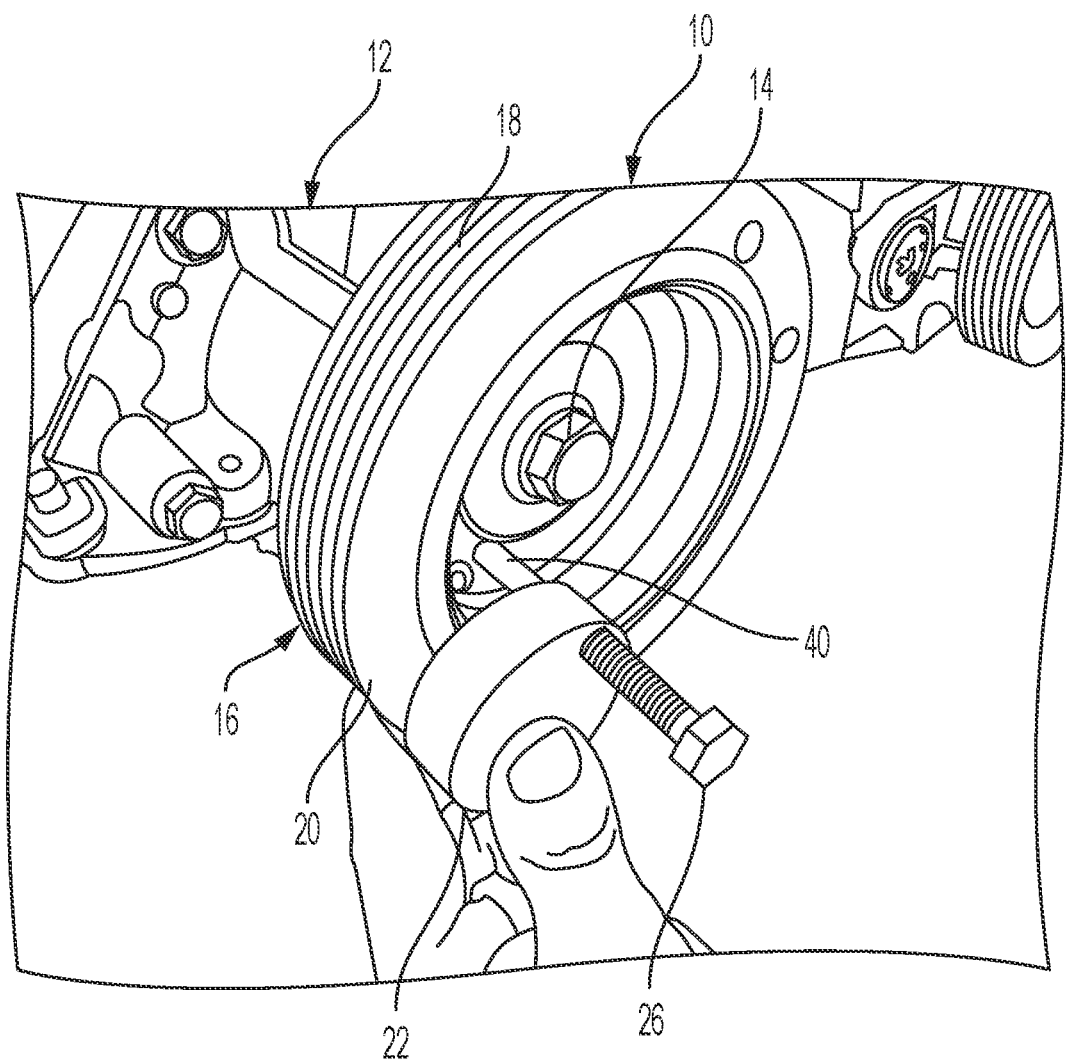
FIG. 1 is a perspective view of a prior art pulley and a custom tool used for elastic belt installation.
Figure 2:
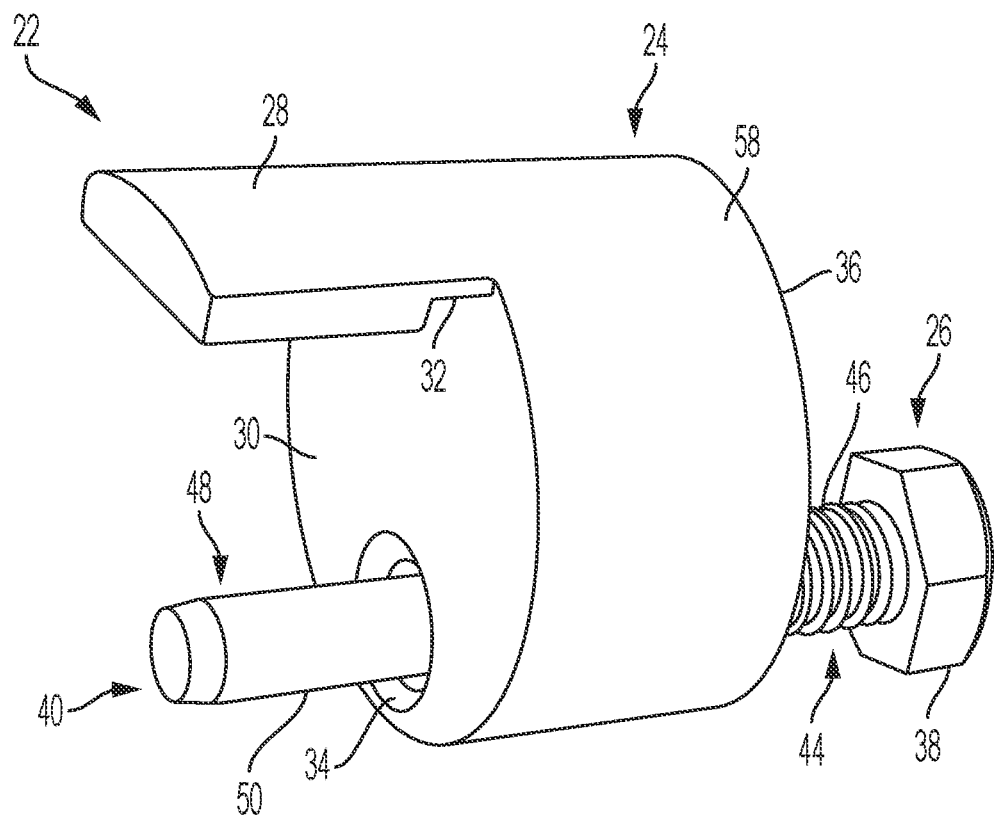
FIG. 2 is a perspective view of the prior art custom tool of FIG. 1.

Referring now to FIGS. 1 and 2, a conventional technique of installing an elastic belt onto a pulley is depicted. It should be understood that while the examples described in the present disclosure for installing an elastic belt on a pulley relates to installation of a belt on a pulley for a water pump for a vehicle, the teachings of the present disclosure may be applied to installation of elastic belts on various different types of pulleys for various different types of engine components such as an A/C compressor, an alternator, a power steering pump, etc. The description of different embodiments of a press-fit pulley according to the present disclosure are not intended to be limiting, as various different types of pulleys may be modified according to the teachings of the present disclosure to permit easier installation of belts onto various different types of engine components.

FIG. 1 depicts a prior art pulley 10 coupled to a water pump 12 by a bolt or cap screw 14. Pulley 10 includes an outer surface 16 having a plurality of circumferential grooves 18. Pulley 10 further includes an outer flange 20 that extends radially outwardly away from cap screw 14 beyond outer surface 16. While not shown, pulley 10 is coupled to a drive shaft by a threaded engagement between cap screw 14 and the drive shaft. Thus, when pulley 10 rotates under the power of a belt, the drive shaft rotates and powers operation of pump 12.

Pulley 10 depicted in FIG. 1 is part of a belt drive system that does not include an automatic tensioner. As such, an elastic belt is used with pulley 10. As is known in the art, an elastic belt is formed at least partially from resilient material such that it may be stretched over one or more pulleys and tensioned onto the pulleys as a result of the stretching. As elastic belts are not easily stretched, installing them onto a set of pulleys (at least the last pulley of the set) can be difficult to do manually, without the aid of a special tool. As shown in FIG. 1, a belt installation tool 22 is a common device used for elastic belt installation.

As best shown in FIG. 2, installation tool 22 includes a body 24 and a bolt 26. A flange 28 depends from an inner surface 30 of body 24. A notch 32 is formed into flange 28 adjacent inner surface 30. Body 24 further includes an opening 34 that extends from an outer surface 36 of body 24 to inner surface 30. A portion of opening 34 adjacent outer surface 36 includes internal threads (not shown). Bolt 26 includes a hex head 38 and a shaft 40. A proximal portion 44 of shaft 40 adjacent hex head 38 includes external threads 46 which are sized to mate with the internal threads (not shown) of body opening 34. A distal portion 48 of shaft 40 has a smooth outer surface 50.

Referring back to FIG. 1, installation tool 22 is mounted to pulley 10 by first placing notch 32 onto outer flange 20. In this location, flange 28 extends over grooves 18 of pulley 10. Bolt 26 is then threaded into body opening 34 until the end of shaft 40 engages pulley 10. Further tightening of bolt 26 into body 24 of tool 22 secures tool 22 to pulley 10 via the engagement of notch 32 with outer flange 20.

Figure 3:
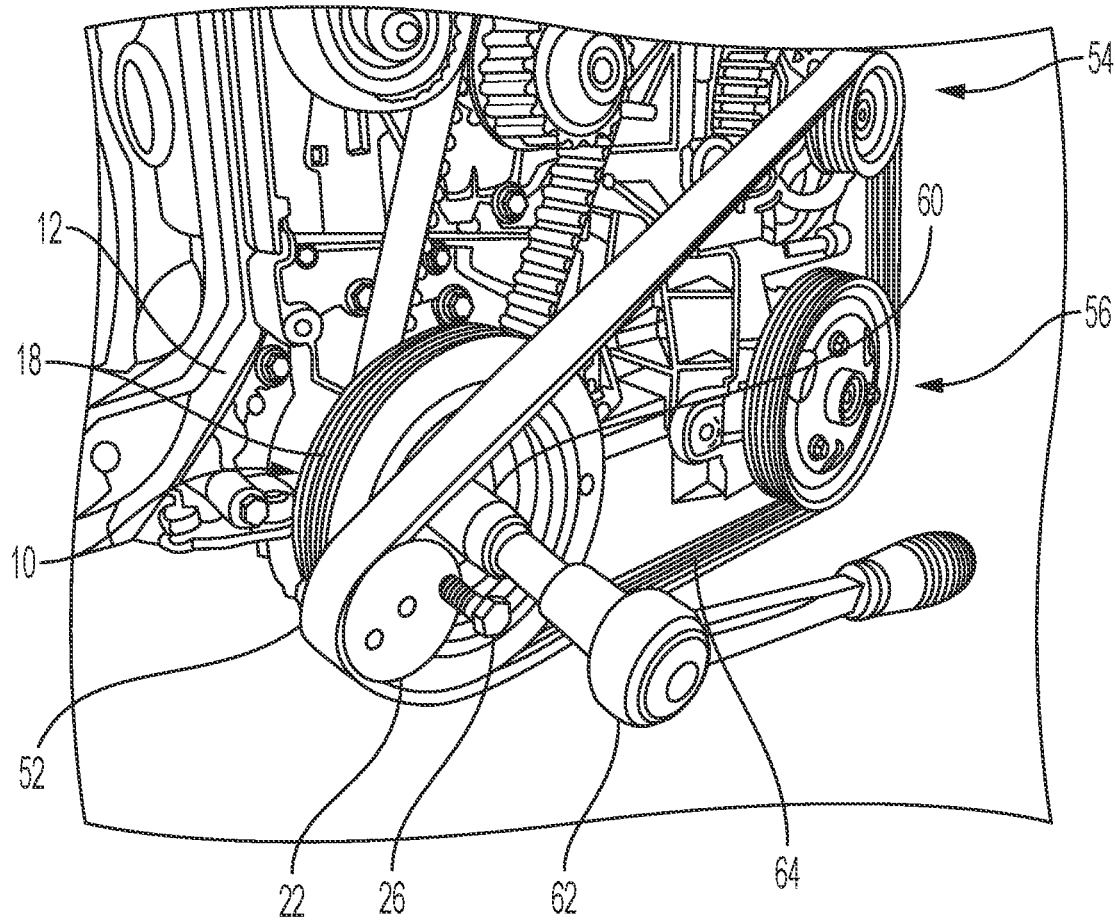
FIG. 3 is a perspective view of a prior art pulley and custom tool depicting installation of an elastic belt.

Referring now to FIG. 3, an elastic belt 52 is installed onto pulley 10 by first threading belt 52 over other pulleys 54, 56 of the set of pulleys to be driven by belt 52. Belt 52 is then placed onto an annular side surface 58 (FIG. 2) of tool body 24 as shown. A socket 60 of a socket wrench 62 is placed onto cap screw 14 of pulley 10 to rotate pulley 10 in a clockwise direction as viewed in the figure, stretching belt 52. When pulley 10 is sufficiently rotated, belt 52 is slid onto flange 28 (FIG. 2) of tool 22 to put belt 52 in position to mate the internal ribs 64 of belt 52 with grooves 18 of pulley 10. Pulley 10 is then further rotated using wrench 62 until tool 22 is no longer engaged by belt 52. Tool 22 is then removed from pulley 10 by loosening bolt 26 and disengaging notch 32 from outer flange 20.

The above-described process for installing an elastic belt onto a pulley is cumbersome and requires special tools. Moreover, this process is only useful for pulleys having cap screw attachment or an outer flange such as outer flange 22. Another prior art pulley is depicted in FIG. 4 that does not include these features.

Figure 4:
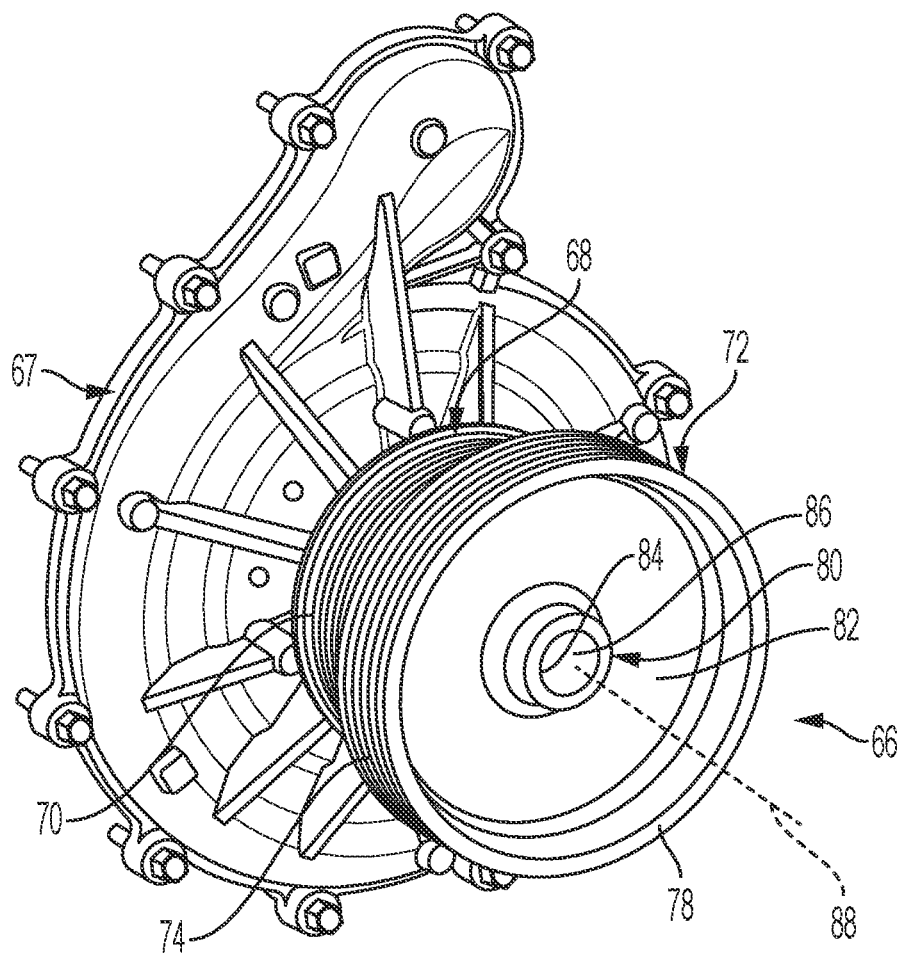
FIG. 4 is a perspective view of a prior art press-fit pulley coupled to a pump.

FIG. 4 shows a press-fit pulley 66 mounted to a water pump 67. Pulley 66 includes a first cylindrical wall 68 having an outer surface with a plurality of circumferential grooves 70 and a second cylindrical wall 72 having an outer surface with a plurality of circumferential grooves 74. In the application depicted, first cylindrical wall 68 may be driven by a belt (not shown) that extends around an automatic tensioner. That belt drives rotation of pump 68 and pulley 66. Grooves 74 of second cylindrical wall 72 mate with ribs on an inner surface of an elastic belt (not shown) that is used to power rotation of at least one other engine component (e.g., a refrigerant compressor). Cylindrical wall 72 includes an annular edge 78, but no outer flange such as flange 20 of pulley 10 (FIGS. 1 and 3). Pulley 66 further includes a central hub 80 and a web 82 extending between an inner surface of cylindrical wall 72 and central hub 80. Central hub 80 includes a central opening 84 that is sized to be press-fit onto a drive shaft 86 coupled to pump 67. As the tensioned belt (not shown) drives first cylindrical wall 68, pulley 66 rotates about axis 88, powering operation of pump 67 and causing rotation of second cylindrical wall 72, which causes rotation of the elastic belt mounted thereon.

As should be apparent from the foregoing, pulley 66 cannot easily be rotated manually using a wrench or other tool to install an elastic belt onto second cylindrical wall 72. Moreover, as pulley 66 does not have an outer flange such as outer flange 20 of pulley 10, a tool such as installation tool 22 cannot be used to assist in mounting an elastic belt to pulley 66. As such, a different press-fit pulley design is desirable.

Figure 5:
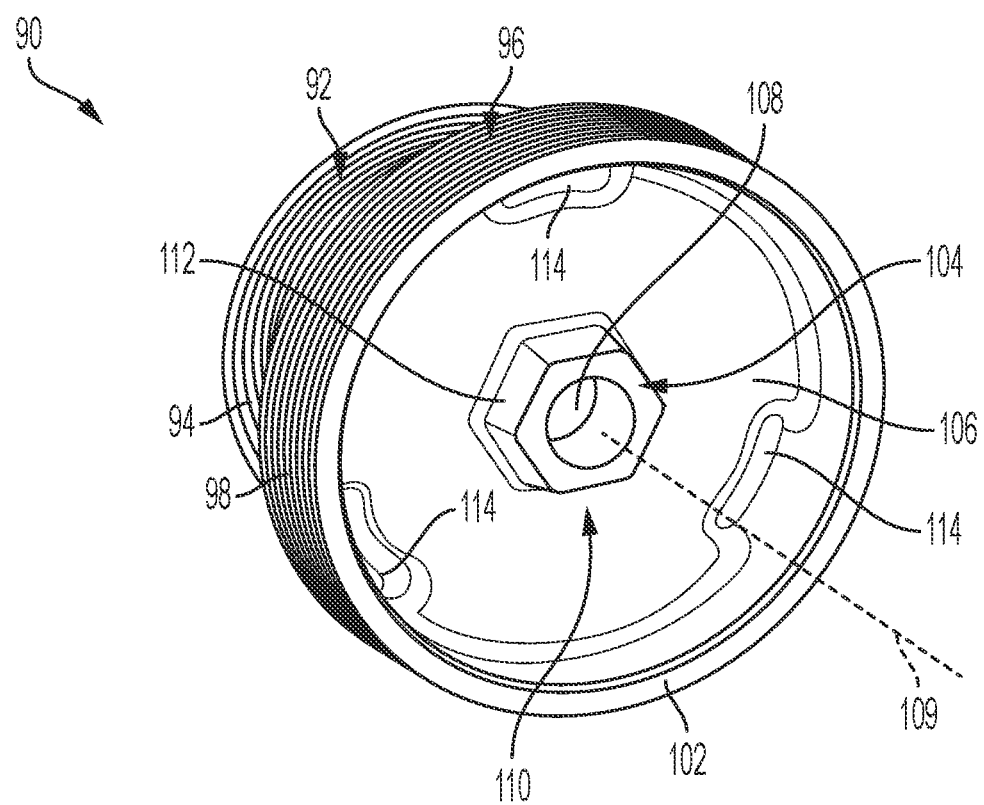
FIG. 5 is a perspective view of one embodiment of a press-fit pulley according to the teachings of the present disclosure.

Referring now to FIG. 5, a first embodiment of a press-fit pulley according to the teachings of the present disclosure is shown. Pulley 90 includes a first cylindrical wall 92 having an outer surface with a plurality of circumferential grooves 94 which is driven by a belt (not shown) that extends around an automatic tensioner. Pulley 90 further includes a second cylindrical wall 96 having an outer surface with a plurality of circumferential grooves 98 which mate with a corresponding plurality of ribs on an inner surface of an elastic belt (not shown) used to power rotation of a pulley driving another engine component. Second cylindrical wall 96 includes an annular edge 102, but no outer flange such as flange 20 of pulley 10 (FIGS. 1 and 3). Pulley 90 further includes a central hub 104 and a web 106 extending between an inner surface of cylindrical wall 96 and central hub 104. Central hub 104 includes a central opening 108 that is sized to be press-fit onto a drive shaft (not shown) coupled to pump (not shown) or other engine component. Pulley 90 rotates about its central axis 109.

Central hub 104 of pulley 90 further includes a drive feature 110 configured to mate with a drive tool such as a socket wrench to facilitate rotation of pulley 90 and installation of an elastic belt onto second cylindrical wall 96. In the embodiment shown, drive feature 110 includes a plurality of engagement surfaces 112 formed on an outer surface of central hub 104. Specifically in this embodiment, six engagement surfaces 112 are formed as flats disposed on central hub 104 in a hexagonal arrangement such that engagement surfaces 112 are together configured to mate with a socket of a standard socket wrench. It should be understood, however, that a variety of other drive features may be formed onto central hub 104. For example, drive feature 110 may include more or fewer engagement surfaces 112 than shown in FIG. 5. The engagement surfaces may be curved instead of flat. Drive feature 110 may comprise one or more protrusions that extend axially outward from central hub 104 relative to axis 109. Alternatively, drive feature 110 may comprise one or more recesses that extend axially inward into central hub 104 relative to axis 109. Other configurations and/or combinations of these configurations are possible. In any of these various embodiments, a standard tool (e.g., a socket of a socket wrench, an end wrench, vice grips, plyers, an Allen wrench, a screwdriver, etc.) or a custom tool may be used to engage drive feature 110 and rotate pulley 90.

Pulley 90 further includes at least one opening 114 formed through web 106. In the embodiment shown, web 106 is formed as a substantially continuous plate that extends between the inner surface of cylindrical wall 96 and an outer surface of central hub 104. Three openings 114 are formed as slots adjacent the inner surface of cylindrical wall 96. In alternative embodiments, more or fewer openings 114 may be formed. In other embodiments, openings 114 are formed in a different shape or having a different orientation relative to cylindrical wall 96. Openings 114 are sized to receive a zip tie or similar device for use in installation of the elastic belt onto pulley 90 in the manner described below.

An elastic belt is installed onto pulley 90 by first threading the belt over other pulleys of the set of pulleys to be driven by the belt. At a location along the circumference of cylindrical wall 96 adjacent one of openings 114, a portion of the belt is placed onto the outer surface of cylindrical wall 96 such that the ribs on the inner surface of the belt mate with grooves 98 at that location. A zip tie is then threaded through opening 114 and around the belt to secure the belt to pulley 90 at the mating location. Then, a standard socket wrench with an appropriately sized socket is coupled to drive feature 110 and used to rotate pulley 90, thereby causing the ribs of the belt to mate with grooves 98 along the circumference of pulley 90. When the belt is substantially fully mounted onto cylindrical wall 96, the zip tie is cut and removed.

Figure 6:
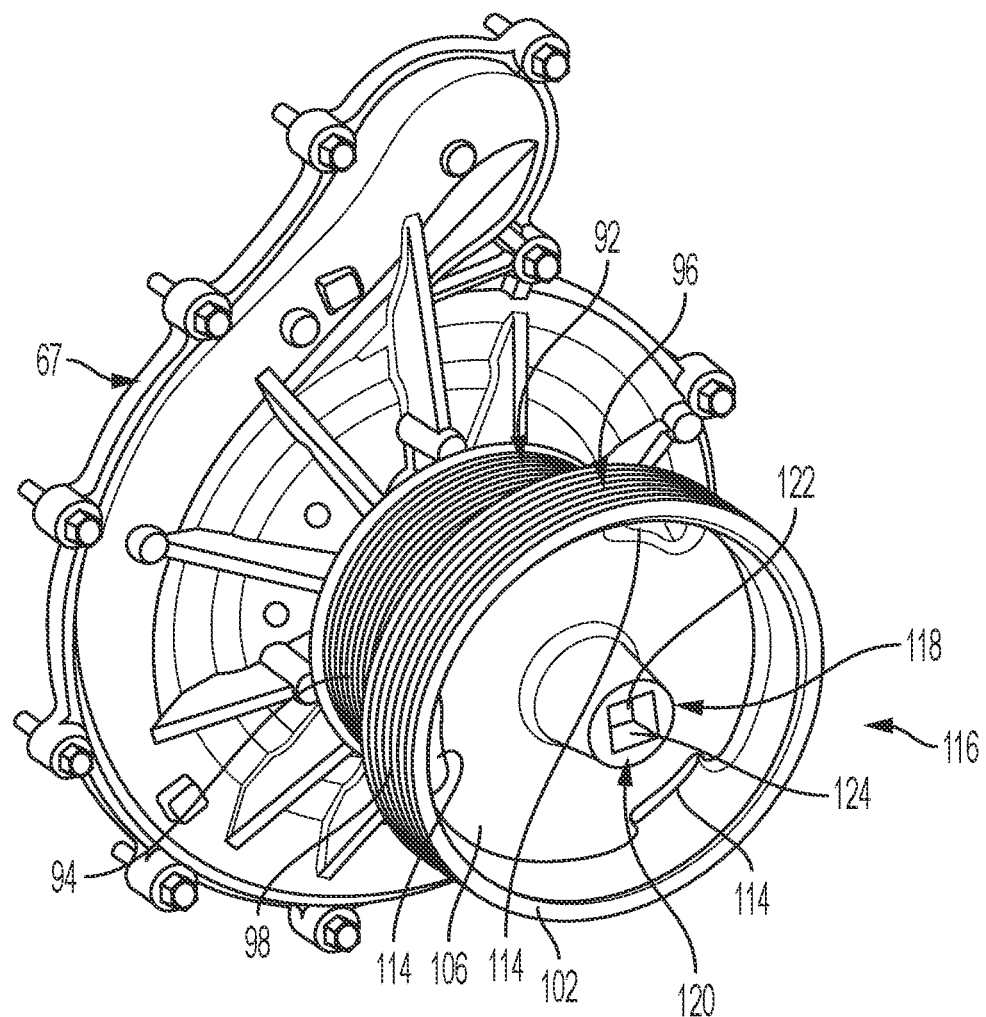
FIG. 6 is a perspective view of another embodiment of a press-fit pulley according to the teachings of the present disclosure.

Referring now to FIG. 6, another embodiment of a press-fit pulley according to the teachings of the present disclosure is shown mounted to a pump 67. Press-fit pulley 116 is substantially similar to pulley 90 of FIG. 5. The same reference numbers are used for pulley 116 to identify features in common with pulley 90. The only difference is the configuration of the central hub and the drive feature.

In pulley 116, central hub 118 includes a drive feature 120 that includes a drive opening 122 that is coaxial with the central opening (not shown) of central hub 118. Drive opening 122 includes a plurality of engagement surfaces 124 disposed along the periphery of drive opening 122. In the embodiment shown, drive opening 122 is square and engagement surfaces 124 include four flat surfaces which are together configured to mate with a square drive of a standard socket wrench. It should be understood that in alternative embodiments, drive opening 122 may have a different shape configured to mate with other standard tools such as a hex driver, a screw driver (Phillips or standard), etc. While central hub 118 of pulley 116 extends farther outwardly from web 106 than central hub 104 of pulley 90 (to accommodate coaxial central opening which is press fit onto a drive shaft and drive opening 122), less clearance may be required to couple a socket wrench to drive feature 120 than drive feature 110 because drive feature 120 does not require the use of a socket. The manner in which an elastic belt is attached to pulley 116 is substantially the same as that described above with reference to FIG. 5. Again, in the embodiment of FIG. 6 as with the embodiment of FIG. 5, no custom tool is required to install an elastic belt onto the press-fit pulley.

It should be understood that in alternative embodiments of the present disclosure, the drive feature of the pulley is not formed on the central hub of the pulley (either the outer surface or the inner surface). For example, the drive feature may be formed on web 106 of the pulley in any form described herein. In still other embodiments, the drive feature may be formed on the inner surface or edge of cylindrical wall 96.

It should be noted that the benefits, advantages, solutions to problems, and any elements that may cause any benefit, advantage, or solution to occur or become more pronounced are not to be construed as critical, required, or essential features or elements. The scope is accordingly to be limited by nothing other than the appended claims, in which reference to an element in the singular is not intended to mean "one and only one" unless explicitly so stated, but rather "one or more." Moreover, where a phrase similar to "at least one of A, B, or C" is used in the claims, it is intended that the phrase be interpreted to mean that A alone may be present in an embodiment, B alone may be present in an embodiment, C alone may be present in an embodiment, or that any combination of the elements A, B or C may be present in a single embodiment; for example, A and B, A and C, B and C, or A and B and C.

In the detailed description herein, references to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art with the benefit of the present disclosure to affect such feature, structure, or characteristic in connection with other embodiments whether or not explicitly described. After reading the description, it will be apparent to one skilled in the relevant art(s) how to implement the disclosure in alternative embodiments.

Furthermore, no element, component, or method step in the present disclosure is intended to be dedicated to the public regardless of whether the element, component, or method step is explicitly recited in the claims. No claim element herein is to be construed under the provisions of 35 U.S.C. 112(f), unless the element is expressly recited using the phrase "means for." As used herein, the terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus Various modifications and additions can be made to the exemplary embodiments discussed without departing from the scope of the present disclosure. For example, while the embodiments described above refer to particular features, the scope of this disclosure also includes embodiments having different combinations of features and embodiments that do not include all of the described features. Accordingly, the scope of the present disclosure is intended to embrace all such alternatives, modifications, and variations as fall within the scope of the claims, together with all equivalents thereof.

We claim:

1. A pulley, comprising:
   a cylindrical wall having an outer surface with a plurality of circumferential grooves configured to receive a corresponding plurality of ribs on an inner surface of an elastic belt;
   a web connected to an inner surface of the cylindrical wall;
   a central hub connected to the web, the central hub comprises a central opening sized to be press-fit onto a drive shaft; and
   a drive feature configured to mate with a drive tool, thereby facilitating rotation of the pulley using the drive tool;
   wherein the web comprises at least one opening adjacent the inner surface of the cylindrical wall, the opening being sized to receive a device for use in installation of the elastic belt onto the pulley.

2. The pulley of claim 1, wherein the web is a substantially continuous plate extending between the inner surface of the cylindrical wall and an outer surface of the central hub.

3. The pulley of claim 1, wherein the drive feature is formed on the central hub.

4. The pulley of claim 1, wherein the drive feature comprises a plurality of engagement surfaces disposed on an outer surface of the central hub.

5. The pulley of claim 4, wherein the drive feature is hexagonal and the plurality of engagement surfaces comprises six flats that are together configured to mate with a socket wrench socket.

6. The pulley of claim 1, wherein the drive feature comprises a drive opening that is coaxial with the central opening of the central hub.

7. The pulley of claim 6, wherein the drive opening comprises a plurality of engagement surfaces disposed along a periphery of the drive opening.

8. The pulley of claim 7, wherein the drive opening is square and the plurality of engagement surfaces comprises four flats that are together configured to mate with a square drive of a socket wrench.

9. The pulley of claim 1, wherein the drive feature is formed on the web.

10. An engine, comprising:
    a crankshaft;
    a plurality of components driven by rotation of the crankshaft, each of the plurality of components comprising a pulley coupled to rotatable element; and
    an elastic belt coupled to the pulleys of the plurality of components;
    wherein at least one component of the plurality of components comprises a press-fit pulley that is press-fit onto a drive shaft of the rotatable element of the at least one component, the press-fit pulley comprising
       a cylindrical wall having an outer surface with a plurality of circumferential grooves configured to receive a corresponding plurality of ribs on an inner surface of the elastic belt, and
       a central hub connected to the cylindrical wall, the central hub comprising a central opening sized to be press-fit onto the drive shaft, and a drive feature configured to mate with a drive tool, thereby facilitating rotation of the pulley using the drive tool to couple the elastic belt to the press-fit pulley;
    wherein the pulley comprises at least one opening adjacent the plurality of circumferential grooves, the opening being configured to receive a device for use in installation of the elastic belt onto the pulley.

11. The engine of claim 10, wherein the drive feature comprises a plurality of engagement surfaces disposed on an outer surface of the central hub.

12. The engine of claim 11, wherein the drive feature is hexagonal and the plurality of engagement surfaces comprises six flats that are together configured to mate with a socket wrench socket.

13. The engine of claim 10, wherein the drive feature comprises a drive opening that is coaxial with the central opening of the central hub.

14. The engine of claim 13, wherein the drive opening comprises a plurality of engagement surfaces disposed along a periphery of the drive opening that are together configured to mate with a square drive of a socket wrench.

* * * * *